(12) United States Patent
Kumar

(10) Patent No.: US 10,250,651 B2
(45) Date of Patent: Apr. 2, 2019

(54) METHOD AND MOBILE TERMINAL FOR PUBLISHING INFORMATION AUTOMATICALLY

(71) Applicant: Huawei Device (Dongguan) Co., Ltd., Dongguan (CN)

(72) Inventor: Valluri Kumar, Bangalore (IN)

(73) Assignee: HUAWEI DEVICE (DONGGUAN) CO., LTD., Dongguan (CN)

(*) Notice: Subject to any disclaimer, the term of this patent is extended or adjusted under 35 U.S.C. 154(b) by 477 days.

(21) Appl. No.: 14/637,552

(22) Filed: Mar. 4, 2015

(65) Prior Publication Data
US 2015/0180918 A1 Jun. 25, 2015

Related U.S. Application Data

(63) Continuation of application No. PCT/CN2013/083028, filed on Sep. 5, 2013.

(30) Foreign Application Priority Data

Sep. 7, 2012 (CN) .......................... 2012 1 0330120

(51) Int. Cl.
*H04L 29/06* (2006.01)
*H04W 4/12* (2009.01)
(Continued)

(52) U.S. Cl.
CPC ............ *H04L 65/403* (2013.01); *H04L 51/02* (2013.01); *H04L 51/32* (2013.01); *H04W 4/12* (2013.01); *H04L 51/38* (2013.01); *H04L 67/26* (2013.01)

(58) Field of Classification Search
CPC ....... H04L 65/403; H04L 51/02; H04L 51/32; H04L 67/26; H04L 51/38; H04W 4/12
See application file for complete search history.

(56) References Cited

U.S. PATENT DOCUMENTS

2005/0075097 A1   4/2005  Lehikoinen et al.
2005/0183143 A1*  8/2005  Anderholm ............ G06F 11/32
                                                      726/22
(Continued)

FOREIGN PATENT DOCUMENTS

CN    101601030 A    12/2009
CN    102868742 A     1/2013
(Continued)

OTHER PUBLICATIONS

Partial English Translation and Abstract of Chinese Patent Application No. CN102868742A, Mar. 17, 2015, 2 pages.
(Continued)

*Primary Examiner* — Philip J Chea
*Assistant Examiner* — Wuji Chen
(74) *Attorney, Agent, or Firm* — Conley Rose, P.C.

(57) ABSTRACT

A method and a mobile terminal for publishing information automatically are provided. The mobile terminal can publish information automatically, thereby reducing user operations and facilitating use for users. The method includes receiving operation information of a user; and sending an information publishing indication message to a predetermined server when a type of the operation information of the user matches a preset operation information type, where the information publishing indication message includes at least an address of the predetermined server, account information of the user, and the operation information, so that the predetermined server publishes the operation information according to the account information. The present invention is applicable to the field of mobile terminal technologies.

14 Claims, 5 Drawing Sheets

---

A mobile terminal receives operation information of a user — 101

↓

When a type of the operation information of the user matches a preset operation information type, send an information publishing indication message to a predetermined server, where the information publishing indication message includes at least an address of the predetermined server, account information of the user and the operation information, so that the predetermined server publishes the operation information according to the account information — 102

(51) Int. Cl.
*H04L 12/58* (2006.01)
*H04L 29/08* (2006.01)

(56) References Cited

U.S. PATENT DOCUMENTS

| | | | |
|---|---|---|---|
| 2009/0066510 A1* | 3/2009 | Kamdar | H04M 1/72572 340/572.1 |
| 2009/0131177 A1* | 5/2009 | Pearce | A63F 13/10 463/43 |
| 2010/0306053 A1* | 12/2010 | Martin | G06F 17/30702 705/14.53 |
| 2011/0320583 A1* | 12/2011 | Parker | H04H 60/32 709/224 |
| 2012/0210377 A1 | 8/2012 | Wong et al. | |
| 2013/0054720 A1* | 2/2013 | Kang | G06Q 10/10 709/206 |
| 2013/0061296 A1* | 3/2013 | Reddy | H04L 51/02 726/5 |
| 2013/0212055 A1 | 8/2013 | Sainz Gonzalez et al. | |
| 2013/0325394 A1* | 12/2013 | Yuen | A61B 5/0002 702/150 |
| 2014/0018053 A1* | 1/2014 | Cho | G06F 3/0488 455/418 |
| 2014/0115061 A1* | 4/2014 | Reddy | H04L 51/02 709/204 |
| 2014/0289872 A1* | 9/2014 | Mun | G06F 21/6245 726/30 |
| 2014/0342826 A1 | 11/2014 | Pearce | |
| 2015/0348053 A1* | 12/2015 | Nieto | G06Q 30/018 705/317 |

FOREIGN PATENT DOCUMENTS

| | | |
|---|---|---|
| EP | 1715703 A1 | 10/2006 |
| WO | 2008094946 A2 | 8/2008 |
| WO | 2011058211 A1 | 5/2011 |
| WO | 2012056326 A2 | 5/2012 |

OTHER PUBLICATIONS

Foreign Communication From a Counterpart Application, PCT Application No. PCT/CN2013/083028, English Translation of International Search Report dated Dec. 12, 2013, 3 pages.
Foreign Communication From a Counterpart Application, PCT Application No. PCT/CN2013/083028, English Translation of Written Opinion dated Dec. 12, 2013, 10 pages.
Simon, J., et al., "NEMOS: Working Towards the "Social" Mobile Phone," XP002629268, IEEE International Conference on Multimedia and Expo, Jun. 28-Jul. 3, 2009, pp. 1784-1788.
Foreign Communication From a Counterpart Application, European Application No. 13835839.5, Extended European Search Report dated Jul. 9, 2015, 6 pages.

* cited by examiner

| Before setting | After setting |
|---|---|
| User setting | User setting |
| Call information ☐ | Call information ☐ |
| Audio information ☐ | Audio information ✓ |
| Video information ☐ | Video information ✓ |
| Network information ☐ | Network information ☐ |
| Location information ☐ | Location information ☐ |
| Picture information ☐ | Picture information ☐ |
| Software operation information ☐ | Software operation information ☐ |

FIG. 3

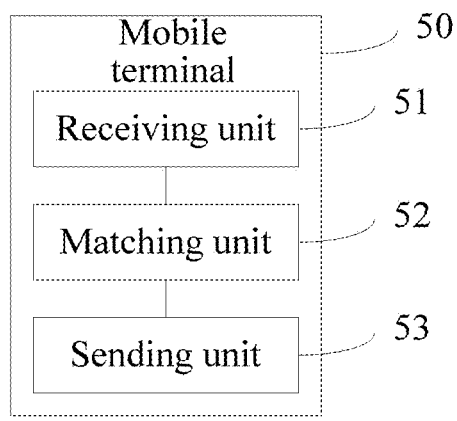

FIG. 4

METHOD AND MOBILE TERMINAL FOR PUBLISHING INFORMATION AUTOMATICALLY

CROSS-REFERENCE TO RELATED APPLICATIONS

This application is a continuation of International Application No. PCT/CN2013/083028, filed on Sep. 5, 2013, which claims priority to Chinese Patent Application No. 201210330120.9, filed on Sep. 7, 2012, both of which are hereby incorporated by reference in their entireties.

TECHNICAL FIELD

The present invention relates to the field of mobile terminal technologies, and in particular, to a method and a mobile terminal for publishing information in real time.

BACKGROUND

Many people now communicate with each other by using a social network (which means a network plus sociability, that is, people are linked by using the network as a carrier, so as to form a group with a certain characteristic. On the social network, people publish personal information or share what they have seen or heard, photos, and videos with relatives and friends, and can see live statuses of the relatives and the friends.

In the prior art, to share information, a user first needs to log in to the social network, and then edit to-be-shared information and publish the to-be-shared information by using the network. With rapid development of mobile terminals such as smartphones, people more tend to install corresponding software on a mobile phone, and use the mobile phone to log in to the social network, so that they can publish to-be-shared information anytime anywhere.

However, although a current social network brings a brand-new life style to people, due to busy work or life of the user, operations such as login to the social network, editing the to-be-shared information, and publishing the to-be-shared information are tedious to the user, which makes it inconvenient for the user to publish the to-be-shared information.

SUMMARY

Embodiments of the present invention provide a method and a mobile terminal for publishing information automatically, where the mobile terminal can publish information automatically, thereby reducing user operations and facilitating use for users.

According to a first aspect, an embodiment of the present invention provides a method for publishing information automatically, where the method includes receiving operation information of a user; and sending an information publishing indication message to a predetermined server when a type of the operation information of the user matches a preset operation information type, where the information publishing indication message includes at least an address of the predetermined server, account information of the user, and the operation information, so that the predetermined server publishes the operation information according to the account information.

In a first possible implementation manner, according to the first aspect, the method further includes setting the preset operation information type before receiving the operation information of the user.

In a second possible implementation manner, with reference to the first aspect or the first possible implementation manner, the method further includes storing the operation information of the user before the sending an information publishing indication message to a predetermined server when a type of the operation information of the user matches a preset operation information type; and sending the information publishing indication message to the predetermined server after a preset time.

In a third possible implementation manner, with reference to the first aspect, the first possible implementation manner, or the second possible implementation manner, the preset operation information type refers to at least one of the following information types: call information, audio information, video information, network information, location information, picture information, and software operation information of a mobile terminal.

In a fourth possible implementation manner, with reference to the first aspect, the first possible implementation manner, the second possible implementation manner, or the third possible implementation manner, the method further includes converting the operation information into information in a text format or a picture format before the sending an information publishing indication message to a predetermined server when a type of the operation information of the user matches a preset operation information type.

According to a second aspect, a mobile terminal for publishing information automatically is provided, including a receiving unit, a matching unit, and a sending unit, where the receiving unit is configured to receive operation information of a user; the matching unit is configured to match a type of the operation information of the user with a preset operation information type; and the sending unit is configured to send an information publishing indication message to a predetermined server when the type of the operation information of the user matches the preset operation information type, where the information publishing indication message includes at least an address of the predetermined server, account information of the user, and the operation information, so that the predetermined server publishes the operation information according to the account information.

In a first possible implementation manner, with reference to the second aspect, the terminal further includes a setting unit, where the setting unit is configured to set the preset operation information type.

In a second possible implementation manner, with reference to the second aspect or the first possible implementation manner, the terminal further includes a storage unit, where the storage unit is configured to store the operation information of the user that is received by the receiving unit; and the sending unit is further configured to send the information publishing indication message to the predetermined server after a preset time.

In a third possible implementation manner, with reference to the second aspect, the first possible implementation manner, or the second possible implementation manner, the preset operation information type refers to at least one of the following information types: call information, audio information, video information, network information, location information, picture information, and software operation information of the mobile terminal.

In a fourth possible implementation manner, with reference to the second aspect, the first possible implementation manner, the second possible implementation manner, or the third possible implementation manner, the terminal further includes a converting unit, where the converting unit is configured to convert the operation information into information in a text format or a picture format.

Embodiments of the present invention provide a method and a mobile terminal for publishing information automatically, where the method includes sending, by a mobile terminal, an information publishing indication message to a predetermined server automatically when a type of operation information of a user matches a preset operation information type after the mobile terminal receives the operation information of the user, where the information publishing indication message includes at least an address of the predetermined server, account information and the operation information, so as to instruct the server to publish the operation information according to the account information. In this way, based on the solution described in the embodiments of the present invention, when publishing to-be-shared information, the user no longer needs to edit the to-be-shared information actively and then send the to-be-shared information to a server; instead, when the type of the operation information of the user matches the preset operation information type, the terminal automatically sends to the server an information publishing indication message that includes the operation information of the user, so as to instruct the server to publish the operation information of the user, thereby reducing user operations and facilitating use for the user.

BRIEF DESCRIPTION OF THE DRAWINGS

To describe the technical solutions in the embodiments of the present invention more clearly, the following briefly describes the accompanying drawings required for describing the embodiments. The accompanying drawings in the following description show merely some embodiments of the present invention, and a person of ordinary skill in the art may still derive other drawings from these accompanying drawings without creative efforts.

FIG. 3 is a schematic diagram of setting a preset operation information type according to an embodiment of the present invention;

FIG. 4 is a schematic structural diagram of a mobile terminal for publishing information automatically according to an embodiment of the present invention;

DETAILED DESCRIPTION

The following clearly and completely describes the technical solutions in the embodiments of the present invention with reference to the accompanying drawings in the embodiments of the present invention. The described embodiments are only a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
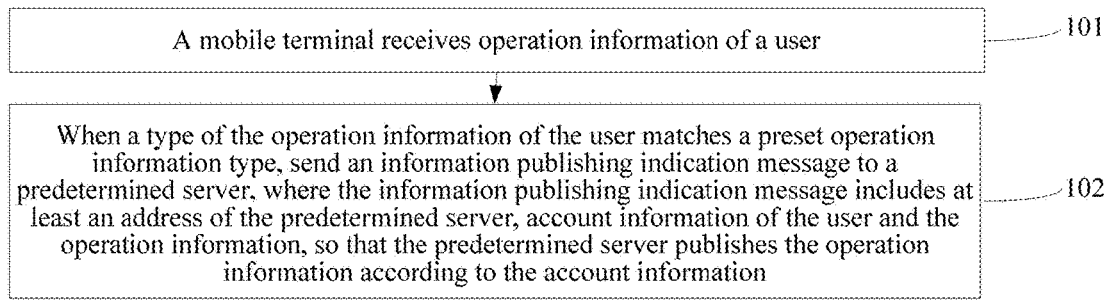
FIG. 1 is a flowchart of a method for publishing information automatically according to an embodiment of the present invention.

This embodiment of the present invention provides a method for publishing information automatically. As shown in FIG. 1, the method includes the following steps.

101. A mobile terminal receives operation information of a user.

The mobile terminal may be a terminal such as a mobile phone or a tablet computer.

Here it should be noted that the mobile terminal may receive the operation information of the user that is sent by a hardware module of the mobile terminal, and certainly may also receive the operation information of the user that is sent by a software module installed in the mobile terminal. This embodiment of the present invention does not set a specific limitation for this.

For example, when the user performs an operation on a mobile phone and selects a piece of music A to play on the mobile phone, an audio module of the mobile phone or a music player installed in the mobile phone sends operation information of the currently playing music A to the mobile phone.

102. When a type of the operation information of the user matches a preset operation information type, the mobile terminal sends an information publishing indication message to a predetermined server, where the information publishing indication message includes at least an address of the predetermined server, account information of the user, and the operation information, so that the predetermined server publishes the operation information according to the account information.

The preset operation information type refers to at least one of the following information types: call information, audio information, video information, network information, location information, picture information, software operation information, and other types.

The call information type refers to the following information types: a short message service message, a voice call, and a video call; the audio information type refers to the following information types: an audio recorded or played by a music player, a recorder, a radio set, or the like; the video information type refers to the following information types: a movie, a teleplay, and various video images that are recorded or played by various multimedia players; the network information type refers to the following information types: various activities performed by the user on the Internet, such as web page browsing, online download, online game, online chat, online sharing, online trading, and the like; the location information type primarily refers to the following information types: a location of the user, or a location change of moving from one place to another place such as moving between main activity sites, for example, information of a location change from home to an office; the picture information type primarily refers to the following information types: a picture taken by using a camera, or an operation performed on an existing picture; and the software operation information type refers to the following information types: login, update, logout, or the like, by the user, of specific software.

The address of the predetermined server may be an address of a social network server, such as a microblog and a blog server, that publishes web logs.

Here it should be noted that the predetermined server may be any server that is set by the user, and certainly may also be any server that is set on the mobile terminal before delivery. After creating a connection to the predetermined server, the terminal that receives the operation information of the user can access the server, and the predetermined server may also send information to the terminal that receives the operation information of the user.

The account information is information for the user to log in to the predetermined server, for example, information such as a user name and a password for login.

Figure 7:
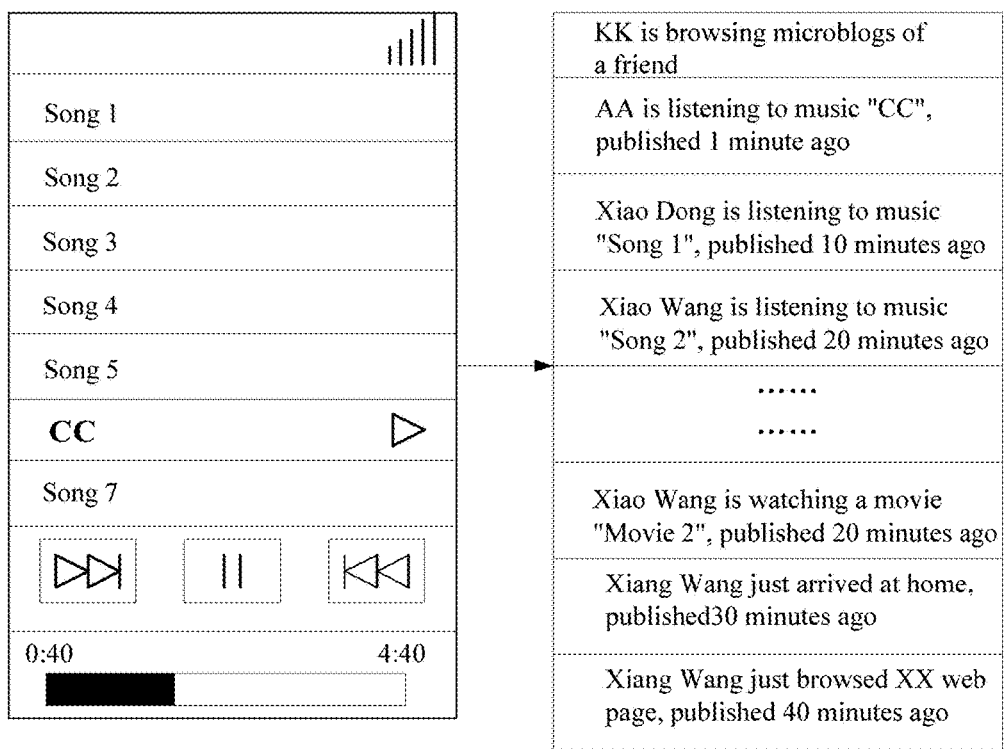
FIG. 7 is a schematic diagram of a mobile terminal's automatically publishing music to be listened to by a user according to an embodiment of the present invention.

For example, as shown on the left side of FIG. 7, it is assumed that a user A is a SINA MICROBLOG user whose user name is AA, and a mobile phone of the user A is playing music "CC". In this case, the information publishing indication message includes a server address of SINA MICROBLOG, account information of the user name AA, and operation information indicating that the user AA is listening to the music "CC". As shown on the right side in FIG. 7, the predetermined server publishes the operation information to the SINA MICROBLOG, where the operation information includes that the user AA is listening to the music "CC". In this way, when browsing microblogs of a friend, a user KK can share information about the music "CC" that is currently listened to by the friend AA.

This embodiment of the present invention provides a method for publishing information automatically, where the method includes sending, by a mobile terminal, an information publishing indication message to a predetermined server automatically when a type of operation information of a user matches a preset operation information type after the mobile terminal receives the operation information of the user, where the information publishing indication message includes at least an address of the predetermined server, account information and the operation information, so as to instruct the server to publish the operation information according to the account information. In this way, based on the solution described in the embodiment of the present invention, when a user publishes information, the user no longer needs to edit to-be-shared information actively and then send the to-be-shared information to a server; instead, when the type of the operation information of the user matches the preset operation information type, the mobile terminal automatically sends to the server an information publishing indication message that includes the operation information of the user, so as to instruct the server to publish the operation information of the user, thereby reducing user operations and facilitating use for the user.

Embodiment 2

Figure 2:
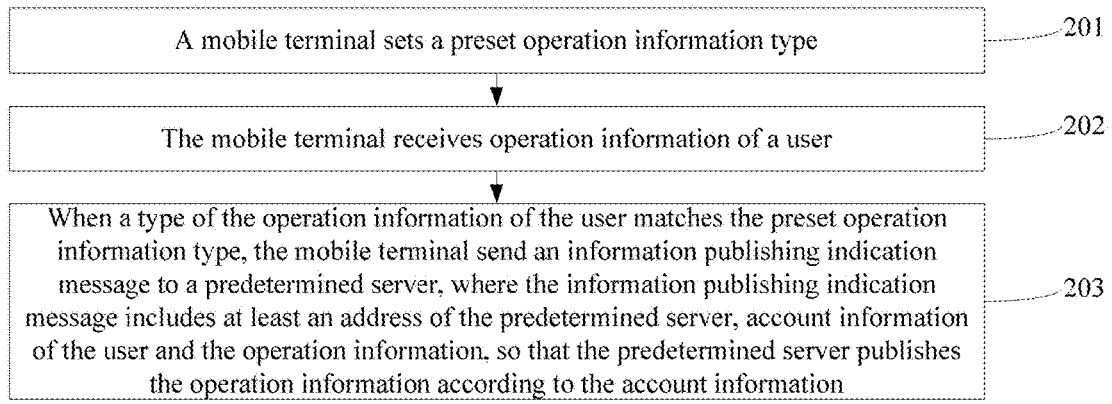
FIG. 2 is a flowchart of another method for publishing information automatically according to an embodiment of the present invention.

This embodiment of the present invention provides a method for publishing information automatically. As shown in FIG. 2, the method includes the following steps.

201. A mobile terminal sets a preset operation information type.

The mobile terminal may be a terminal such as a mobile phone or a tablet computer.

To improve user experience, a user may, according to a need or a personal preference of the user, freely set the type of operation information to be automatically published.

FIG. 3 shows an interface in which a user sets a preset operation information type. As can be seen from FIG. 3, the preset operation information types set by the user include the following types: audio information and video information. Therefore, when the received operation information type of the user is the audio information type or the video information type, the mobile terminal may send the operation information to a predetermined server on a network side anytime anywhere, so that the predetermined server publishes the operation information of the user, and other users can share preferred music, video works, and the like of the user. For an operation information type not set by the user, when the mobile terminal receives operation information of the type that is not set, the mobile terminal does not publish the information, which properly protects user privacy.

The preset operation information type refers to at least one of the following information types: call information, audio information, video information, network information, location information, picture information, software operation information, and other types.

The call information type refers to the following information types: a short message service message, a voice call, and a video call; the audio information type refers to the following information types: an audio recorded or played by a music player, a recorder, a radio set, or the like; the video information type refers to the following information types: a movie, a teleplay, and various video images that are recorded or played by various multimedia players; the network information type refers to the following information types: various activities performed by the user on the Internet, such as webpage browsing, online download, online game, online chat, online sharing, online trading, and the like; the location information type primarily refers to the following information types: a location of the user, or a location change of moving from one place to another place such as moving between main activity sites, for example, information of a location change from a home to an office; the picture information type primarily refers to the following information types: a picture taken by using a camera, or an operation performed on an existing picture; and the software operation information type refers to the following information types: login, update, logout, or the like, by the user, of specific software.

202. The mobile terminal receives operation information of a user.

Here it should be noted that the mobile terminal may receive the operation information of the user that is sent by a hardware module of the mobile terminal, and certainly may also receive the operation information of the user that is sent by a software module installed on the mobile terminal. This embodiment of the present invention does not set a specific limitation for this.

For example, when the user performs an operation on a mobile phone and selects a piece of music A to play on the mobile phone, an audio module of the mobile phone or a music player installed in the mobile phone sends operation information of the currently playing music A to the mobile phone.

203. When a type of the operation information of the user matches a preset operation information type, the mobile terminal sends an information publishing indication message to a predetermined server, where the information publishing indication message includes at least an address of the predetermined server, account information of the user, and the operation information, so that the predetermined server publishes the operation information to the server according to the account information.

The address of the predetermined server may be an address of a social network server, such as a microblog and a blog server, that publishes web logs.

Here it should be noted that the predetermined server may be any server that is set by the user, and certainly may also be any server that is set on the mobile terminal before delivery. After creating a connection to the predetermined server, the terminal that receives the operation information of the user can access the server, and the predetermined server may also send information to the terminal that receives the operation information of the user.

The account information is information for the user to log in to the predetermined server, for example, information such as a user name and a password for login.

For example, it is assumed that a user A is a SINA MICROBLOG user whose user name is AA, and a mobile phone of the user A is playing music. In this case, the information publishing indication message includes a server address of SINA MICROBLOG, account information of the user name AA, and operation information including playing music.

Preferably, before sending an information publishing indication message to a predetermined server when a type of the operation information of the user matches a preset operation information type, the mobile terminal may convert the operation information into information in a text format or a picture format.

Figure 8:
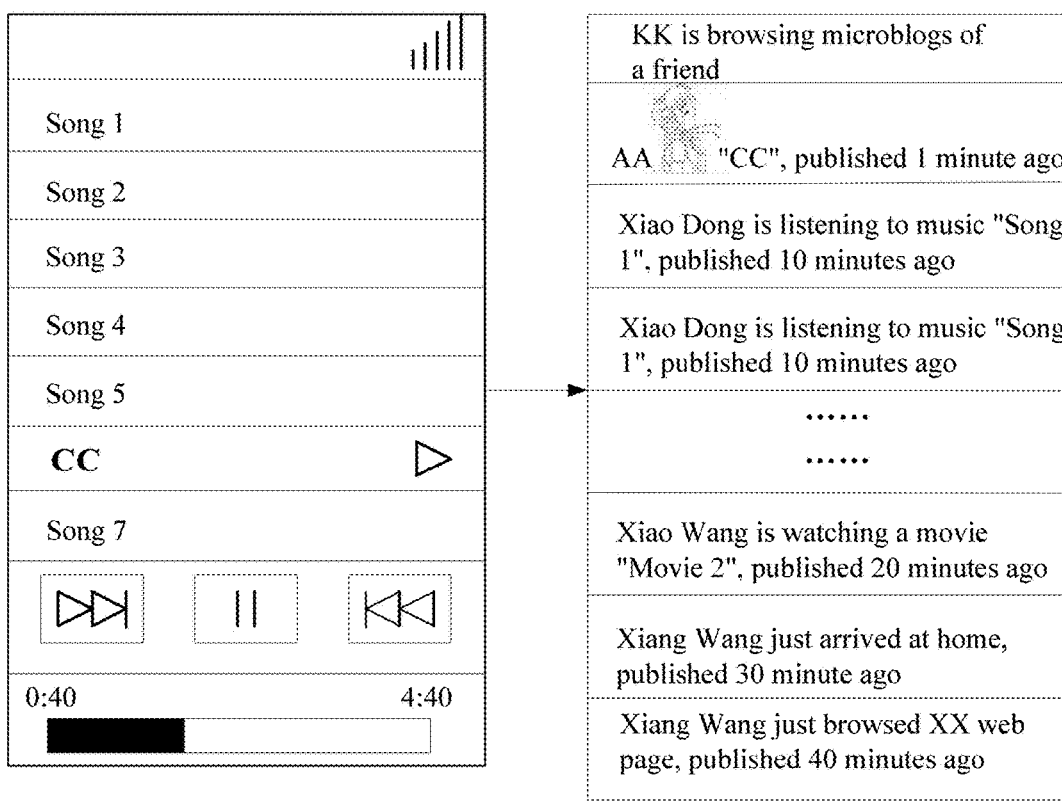
FIG. 8 is a schematic diagram of a mobile terminal's automatically publishing of that a user is listening to music according to an embodiment of the present invention.

For example, a user A is a SINA MICROBLOG user, a user name of the user A in the SINA MICROBLOG is AA, and the user A intends to automatically share his/her own music information in the SINA MICROBLOG. In this case, a server address preset in the mobile terminal is a server address of the SINA MICROBLOG. In this way, after the mobile terminal receives operation information indicating that an audio module is playing a song "CC", the mobile terminal may convert the operation information, which indicates playing of the song "CC", into a picture format, and send the operation information to a predetermined player. As shown on the right side of FIG. 8, the predetermined server publishes the operation information in the picture format to the SINA MICROBLOG, where the operation information includes that the user AA is listening to the music "CC". In this way, when browsing microblogs of a friend, a friend KK of the user AA can share the information, which is in the picture format, about the music "CC" that is currently listened to by the friend AA.

It should be noted that the present invention does not set a specific limitation on the format into which the operation information is converted.

Further, when the type of the received operation information of the user matches the preset operation information type after a preset time, the mobile terminal may pre-store the operation information of the user. Within the preset time, the mobile terminal may store multiple pieces of the operation information of the user. After the preset time, the mobile terminal sends the information publishing indication message to the predetermined server, where operation information included in the information publishing indication message is the operation information stored in the mobile terminal.

In this way, after receiving the operation information of the user, the mobile terminal does not need to send the information publishing indication message that includes the operation information to the predetermined server whenever the operation information matches the preset operation information type. Instead, after the preset time, the mobile terminal sends all operation information stored in the terminal together to the predetermined server, thereby reducing the number of times of sending by the terminal and reducing the workload of the mobile terminal.

The preset time may also be a specific time point value. At a specific time point, the mobile terminal sends the information publishing indication message to the predetermined server, where the information publishing indication message includes the operation information of the user that is stored in the mobile terminal.

Certainly, the preset time may be a specific period of time. Whenever after the period of time elapses, the mobile terminal sends the information publishing indication message to the predetermined server, where the information publishing indication message includes the operation information of the user that is stored in the mobile terminal.

This embodiment of the present invention provides a method for publishing information automatically. In the method, a preset operation information type is set first; then after operation information of a user is received, a type of the operation information of the user is matched with the preset operation information type; and, when the type of the operation information of the user matches the preset operation information type, an information publishing indication message is sent to a predetermined server, so as to instruct the predetermined server to publish the operation information according to the account information. In this way, based on the solution described in this embodiment of the present invention, when publishing to-be-shared information, a user does not need to edit the to-be-shared information actively and then send the to-be-shared information to the server; instead, according to a personal preference or a need of the user, a preset operation information type, that is, a type of the to-be-shared information that the user needs to publish, may be set first. In this way, when the type of the operation information of the user matches the preset operation information type, a terminal may automatically send to the server an information publishing indication message that includes the operation information of the user, so as to instruct the server to publish the operation information of the user, thereby reducing the user operations and facilitating use for the user.

Embodiment 3

This embodiment of the present invention provides a mobile terminal 50 for publishing information automatically, as shown in FIG. 4, which includes a receiving unit 51, a matching unit 52, and a sending unit 53.

The receiving unit 51 is configured to receive operation information of a user.

The mobile terminal 50 may be a terminal such as a mobile phone or a tablet computer.

Here it should be noted that the receiving unit 51 may receive the operation information of the user that is sent by a hardware module of the mobile terminal, and certainly may also receive the operation information of the user that is sent by a software module installed on the mobile terminal. This embodiment of the present invention does not set a specific limitation for this.

For example, when the user performs an operation on a mobile phone and selects a piece of music A to play on the mobile phone, an audio module of the mobile phone or a music player installed in the mobile phone sends operation information of the currently playing music A to the receiving unit 51.

The matching unit 52 is configured to match a type of the operation information of the user with a preset operation information type.

The preset operation information type refers to at least one of the following information types: call information, audio information, video information, network information, location information, picture information, software operation information, and other types.

The call information type refers to the following information types: a short message service message, a voice call, and a video call; the audio information type refers to the following information types: an audio recorded or played by a music player, a recorder, a radio set, or the like; the video information type refers to the following information types: a movie, a teleplay, and various video images that are recorded or played by various multimedia players; the network information type refers to the following information types: various activities performed by the user on the Internet, such as webpage browsing, online download, online game, online chat, online sharing, online trading, and the like; the location information type primarily refers to the following information types: a location of the user, or a location change of moving from one place to another place such as moving between main activity sites, for example, information of a location change from a home to an office; the picture information type primarily refers to the following information types: a picture taken by using a camera, or an operation performed on an existing picture; and the software operation information type refers to the following information types: login, update, logout, or the like, by the user, of specific software.

The sending unit 53 is configured to send an information publishing indication message to a predetermined server when the type of the operation information of the user matches the preset operation information type, where the information publishing indication message includes at least an address of the predetermined server, account information of the user, and the operation information, so that the predetermined server publishes the operation information according to the account information.

The address of the predetermined server may be an address of a social network server, such as a microblog and a blog server, that publishes web logs.

Here it should be noted that the predetermined server may be any server that is set by the user, and certainly may also be any server that is set on the mobile terminal before delivery. After creating a connection to the predetermined server, the mobile terminal can access the server, and the predetermined server may also send information to the mobile terminal.

The account information is information for the user to log in to the predetermined server, for example, information such as a user name and a password for login.

For example, as shown on the left side of FIG. 7, it is assumed that a user A is a SINA MICROBLOG user whose user name is AA, and a mobile phone of the user A is playing music "CC". In this case, the information publishing indication message includes a server address of SINA MICROBLOG, account information of the user name AA, and operation information indicating that the user AA is listening to the music "CC". As shown on the right side in FIG. 7, the predetermined server publishes the operation information to the SINA MICROBLOG, where the operation information includes that the user AA is listening to the music "CC". In this way, when browsing microblogs of a friend, a user KK can share information about the music "CC" that is currently listened to by the friend AA.

This embodiment provides a mobile terminal for publishing information automatically, where the terminal includes a receiving unit, a matching unit, and a sending unit, where the receiving unit is configured to receive operation information of a user; after the receiving unit receives the operation information of the user, the matching unit is configured to match a type of the operation information of the user with a preset operation information type, and, if the type of the operation information of the user matches the preset operation information type, the sending unit is configured to send an information publishing indication message to a predetermined server automatically, where the information publishing indication message includes at least an address of the predetermined server, account information of the user, and the operation information, so as to instruct the server to publish the operation information to the server according to the account information. In this way, based on the solution described in the embodiment of the present invention, when a user publishes information, the user does not need to edit to-be-shared information by using the terminal and then send the to-be-shared information to the server; instead, it may be that the terminal automatically matches operation information of the user with preset operation information, and then automatically instructs the predetermined server to publish the operation information that matches the preset operation information, thereby reducing user operations and facilitating use for the user.

Embodiment 4

Figure 5:
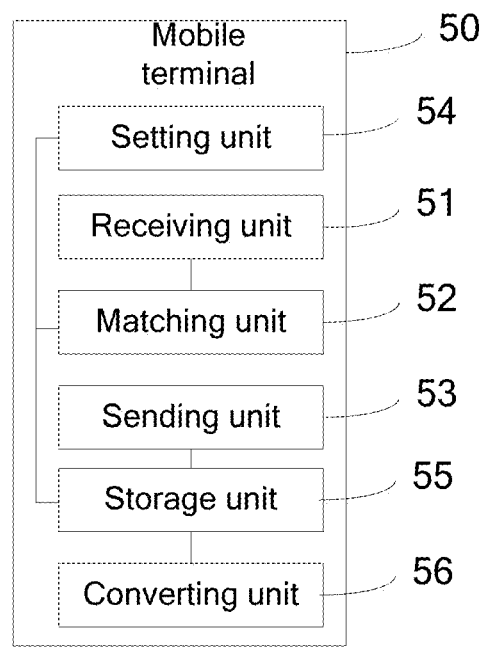
FIG. 5 is a schematic structural diagram of another mobile terminal for publishing information automatically according to an embodiment of the present invention.

This embodiment of the present invention provides a terminal 50 for publishing information automatically. As shown in FIG. 5, the terminal includes a receiving unit 51, a matching unit 52, a sending unit 53, and a setting unit 54.

The setting unit 54 is configured to set a preset operation information type.

The receiving unit 51 is configured to receive operation information of a user.

The matching unit 52 is configured to match a type of the operation information of the user with the preset operation information type.

The sending unit 53 is configured to send an information publishing indication message to a predetermined server when the type of the operation information of the user matches the preset operation information type, where the information publishing indication message includes at least an address of the predetermined server, account information of the user, and the operation information, so that the server publishes the operation information according to the account information.

Optionally, the mobile terminal 50 for publishing information automatically further includes a storage unit 55.

The storage unit 55 is configured to store the operation information received by the receiving unit 51.

The sending unit 53 is further configured to send the information publishing indication message to the predetermined server within a preset time.

Optionally, the mobile terminal 50 for publishing information automatically further includes a converting unit 56.

The converting unit 56 is configured to convert the operation information into information in a text format or a picture format.

For brevity, no repeated description is given here. For technical details that are not disclosed, refer to Embodiment 2 of the present invention.

This embodiment of the present invention provides a mobile terminal for publishing information automatically, where the mobile terminal includes a receiving unit, a matching unit, a sending unit, and a setting unit. The setting unit is configured to set a preset operation information type; the receiving unit is configured to receive operation information of a user; the matching unit is configured to match a type of the operation information of the user with the preset operation information type after the receiving unit receives the operation information of the user; and the sending unit is configured to send an information publishing indication message to a predetermined server automatically when the type of the operation information of the user matches the preset operation information type, where the information publishing indication message includes at least an address of the predetermined server, account information of the user, and the operation information, so as to instruct the predetermined server to publish the operation information according to the account information. In this way, based on the technical solution described in this embodiment of the present invention, when publishing to-be-shared information, a user does not need to edit the to-be-shared information actively and then send the to-be-shared information to a server; instead, according to a personal preference or a need of the user, the setting unit may set a preset operation information type, that is, a type of the to-be-shared information that the user needs to publish. In this way, when the matching unit matches and finds that the type of the operation information of the user matches the preset operation information type, the sending unit may automatically send the information publishing indication message that includes the operation information of the user to the predetermined server, so as to instruct the server to publish the operation information of the user, thereby reducing user operations and facilitating use for the user.

Embodiment 5

Figure 6:
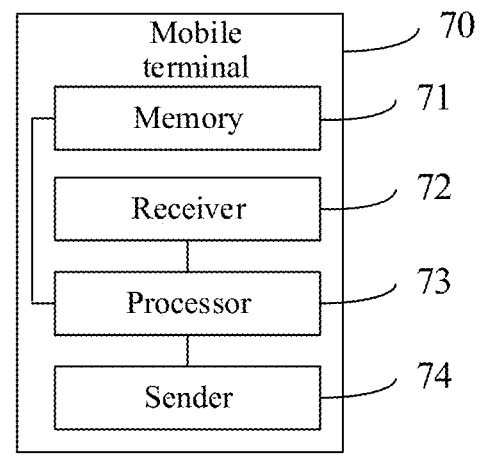
FIG. 6 is a schematic structural diagram of yet another mobile terminal for publishing information automatically according to an embodiment of the present invention.

This embodiment of the present invention provides a mobile terminal 70 for publishing information automatically, as shown in FIG. 6, which includes a memory 71, a receiver 72, a processor 73, and a sender 74.

The memory 71 is configured to store a preset operation information type, an address of the predetermined server, and account information of a user.

The receiver 72 is configured to receive operation information of the user, and send the operation information to the processor 73.

The processor 73 is configured to receive the operation information sent by the receiver 72, obtain the preset operation information type from the memory 71, match a type of the operation information of the user with the preset operation information type, and, when the type of the operation information of the user matches the preset operation information type, send the operation information of the user to the sender 74.

The sender 74 is configured to receive the operation information sent by the processor 72, obtain the address of the predetermined server and the account information of the user from the memory 71, and send an information publishing indication message to the predetermined server, where the information publishing indication message includes at least the address of the predetermined server, the account information of the user, and the operation information, so that the server publishes the operation information to the server according to the account information.

Optionally, the receiver 72 is further configured to receive the set preset operation information type.

The processor 73 is further configured to store the set preset operation information type into the memory 71.

Optionally, the processor 73 is further configured to store the operation information of the user that is received by the receiver 72 into the memory 71.

The memory 71 is further configured to store the operation information of the user.

The sender 74 is further configured to obtain the operation information of the user from the memory 71 after a preset time, and send the information publishing indication message to the server.

Optionally, the processor 73 is further configured to convert the operation information into information in a text format or a picture format.

For brevity, no repeated description is given here. For technical details that are not disclosed, refer to Embodiment 2 of the present invention.

This embodiment of the present invention provides a mobile terminal for publishing information automatically, including a memory, a receiver, a processor, and a sender. The memory is configured to store a preset operation information type, an address of the predetermined server, and account information of a user; after receiving the operation information of the user, the receiver sends the operation information to the processor; then the processor receives the operation information sent by the receiver, obtains the preset operation information type from the memory, matches a type of the operation information of the user with the preset operation information type, and, when the type of the operation information of the user matches the preset operation information type, sends the operation information of the user to the sender; and the sender receives the operation information sent by the processor, obtains the address of the predetermined server and the account information of the user from the memory, and sends an information publishing indication message to the predetermined server automatically, so as to instruct the server to publish the operation information to the server according to the account information. In this way, when publishing to-be-shared information, a user does not need to edit the to-be-shared information actively and then send the to-be-shared information to a server, and therefore may reduce user operations and facilitate use for users.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random-access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for publishing information automatically, comprising:
   receiving, by a mobile terminal, operation information of a user;
   matching, by the mobile terminal, types of the operation information of the user with preset operation information types, the preset information types being selected from a menu on a user interface of the mobile terminal, the menu comprising different preset operation information types, the different preset operation information types comprising a call information type, an audio information type, a video information type, a network information type, a location information type, a picture information type, and a software operation information type, the call information type comprising a short message service message, a voice call, and a video call, the audio information type comprising audio recorded or played by a music player, a recorder, and a radio set, the video information type comprising a movie, a teleplay, and video images that are recorded or played by multimedia players, the network information type comprising web page browsing, online download, online game, online chat, online sharing, and online trading, the location information type comprising a location of the user and a location change of moving from one place to another place, the picture information type comprising a picture taken using a camera and an operation performed on an existing picture, and the software operation information type comprising a login, update, and logout of the user;

selectively storing, by the mobile terminal, the operation information of the user for a preset time when the types of the operation information of the user match the preset operation information types, the mobile terminal only storing a portion of the operation information that matches the preset operation information types selected by the user, and the mobile terminal not storing another portion of the operation information that does not match the preset operation information types selected by the user; and sending, by the mobile terminal, an information publishing indication message to a predetermined server after the preset time, the information publishing indication message comprising at least an address of the predetermined server, account information of the user, and all stored operation information such that the predetermined server is able to publish all the stored operation information according to the account information.

2. The method of claim 1, wherein before receiving the operation information of the user, the method further comprises setting, by the mobile terminal, the preset operation information types.

3. The method of claim 1, wherein the preset operation information types comprise at least two of the following information types: call information, audio information, video information, network information, location information, picture information, or software operation information of the mobile terminal.

4. The method of claim 1, wherein before sending the information publishing indication message to the predetermined server after the preset time, the method further comprises converting, by the mobile terminal, the operation information into information in a text format or a picture format.

5. A mobile terminal for publishing information automatically, comprising:
a receiver configured to receive operation information of a user;
a processor coupled to the receiver and configured to match types of the operation information of the user with preset information types;
a memory coupled to the processor and configured to selectively store the operation information of the user for a preset time when the types of the operation information of the user matches the preset operation information types, the memory only storing a portion of the operation information that matches the preset operation information types selected by the user, and the memory not storing another portion of the operation information that does not match the preset operation information types selected by the user, the preset operation information types being selected from a menu on a user interface of the mobile terminal, the menu comprising different preset operation information types, the different preset operation information types comprising a call information type, an audio information type, a video information type, a network information type, a location information type, a picture information type, and a software operation information type, the call information type comprising a short message service message, a voice call, and a video call, the audio information type comprising audio recorded or played by a music player, a recorder, and a radio set, the video information type comprising a movie, a teleplay, and video images that are recorded or played by multimedia players, the network information type comprising web page browsing, online download, online game, online chat, online sharing, and online trading, the location information type comprising a location of the user and a location change of moving from one place to another place, the picture information type comprising a picture taken using a camera and an operation performed on an existing picture, and the software operation information type comprising a login, update, and logout of the user; and
a transmitter coupled to the processor and configured to send an information publishing indication message to a predetermined server, the information publishing indication message comprising at least an address of the predetermined server, account information of the user, and all stored operation information such that the predetermined server is able to publish all the stored operation information according to the account information.

6. The terminal of claim 5, wherein the processor is further configured to set the preset operation information types.

7. The terminal of claim 5, wherein the preset operation information types comprise at least two of the following information types: call information, audio information, video information, network information, location information, picture information, or software operation information of the mobile terminal.

8. The terminal of claim 5, wherein the processor is further configured to convert the operation information into information in a text format or a picture format.

9. The method of claim 1, wherein the preset time comprises a time point value.

10. The method of claim 1, wherein the preset time comprises a period of time.

11. The terminal of claim 5, wherein the preset time comprises a time point value.

12. The terminal of claim 5, wherein the preset time comprises a period of time.

13. The method of claim 1, further comprising converting all of the stored operation information to text format such that each piece of the stored operation information is described in words.

14. The terminal of claim 5, wherein the processor is further configured to convert all of the stored operation information to text format such that each piece of the stored operation information is described in words.

* * * * *